United States Patent
Väisänen et al.

(10) Patent No.: US 10,427,920 B2
(45) Date of Patent: Oct. 1, 2019

(54) METHOD OF DETECTING A WORN LINK IN A CHAIN, AND A HOIST ARRANGEMENT

(71) Applicant: Konecranes Global Corporation, Hyvinkää (FI)

(72) Inventors: Ari Väisänen, Hyvinkää (FI); Tomi Heinonen, Hyvinkää (FI)

(73) Assignee: KONECRANES GLOBAL CORPORATION, Hyvinkää (FI)

(*) Notice: Subject to any disclaimer, the term of this patent is extended or adjusted under 35 U.S.C. 154(b) by 355 days.

(21) Appl. No.: 15/326,885

(22) PCT Filed: Jul. 30, 2015

(86) PCT No.: PCT/FI2015/050515
§ 371 (c)(1),
(2) Date: Jan. 17, 2017

(87) PCT Pub. No.: WO2016/016514
PCT Pub. Date: Feb. 4, 2016

(65) Prior Publication Data
US 2017/0203941 A1    Jul. 20, 2017

(30) Foreign Application Priority Data
Aug. 1, 2014    (FI) .................................... 20145702

(51) Int. Cl.
| | | |
|---|---|---|
| *B66D 1/64* | (2006.01) | |
| *B66D 3/26* | (2006.01) | |
| *B66D 1/54* | (2006.01) | |
| *B66D 3/20* | (2006.01) | |
| *G01L 5/04* | (2006.01) | |
| *G01L 5/10* | (2006.01) | |

(Continued)

(52) U.S. Cl.
CPC ................ *B66D 3/26* (2013.01); *B66C 15/00* (2013.01); *B66D 1/54* (2013.01); *B66D 3/20* (2013.01); *G01L 5/047* (2013.01); *G01L 5/10* (2013.01); *G01M 13/023* (2013.01); *B66D 2700/025* (2013.01)

(58) Field of Classification Search
CPC .. B66C 15/065; B66D 1/54; B66D 2700/025; B66D 3/20; B66D 3/26; G01L 5/047; G01L 5/10
See application file for complete search history.

(56) References Cited

U.S. PATENT DOCUMENTS

| | | | |
|---|---|---|---|
| 3,998,317 A | 12/1976 | Stinnett | |
| 2007/0205405 A1* | 9/2007 | Stockmaster | ............ B66D 3/18 254/275 |

(Continued)

FOREIGN PATENT DOCUMENTS

| | | | |
|---|---|---|---|
| DE | 29504180 | * 6/1996 | ............... B66D 1/54 |
| DE | 195 08 727 A1 | 8/1996 | |

(Continued)

*Primary Examiner* — Emmanuel M Marcelo
(74) *Attorney, Agent, or Firm* — Birch, Stewart, Kolasch & Birch, LLP

(57) ABSTRACT

A method for detecting a worn link in a chain of a host arrangement includes measuring a first signal while the hoist operates. A hoist arrangement and use of a signal for detecting a worn link in a chain are also disclosed.

11 Claims, 2 Drawing Sheets

(51) Int. Cl.
    *G01M 13/023*    (2019.01)
    *B66C 15/00*     (2006.01)

(56) References Cited

U.S. PATENT DOCUMENTS

2012/0128448 A1* 5/2012 Allgeier ............... A61G 7/1017
                                                    414/21
2012/0325021 A1   12/2012 Nishikawa
2014/0037414 A1*  2/2014 Hren ..................... E02F 9/14
                                                    414/694

FOREIGN PATENT DOCUMENTS

| | | |
|---|---|---|
| DE | 295 04 180 U1 | 8/1996 |
| EP | 1 145 996 A1 | 10/2001 |
| GB | 2 406 844 A | 4/2005 |
| JP | 2013-10634 A | 1/2013 |
| WO | WO 2007/012796 A1 | 2/2007 |
| WO | WO 2012/080570 A1 | 6/2012 |

* cited by examiner

METHOD OF DETECTING A WORN LINK IN A CHAIN, AND A HOIST ARRANGEMENT

FIELD OF THE INVENTION

The present invention relates to a method and arrangement of detecting wearing of a chain, and more particularly to detecting wearing of individual links of a chain in a hoist arrangement.

BACKGROUND OF THE INVENTION

Chains are used in hoists to raise or lower payloads using wheels, pulleys or other actuators driven with an electric drive system. The chain of the hoist arrangement has to be inspected regularly in addition to full scale maintenance of the system. A worn out chain causes jamming of the drive and in worst case the worn out chain may break which may cause a serious accident. The chain can be inspected visually or by manual measurements but it takes a long time to inspect each link of the chain on a regular basis so its negative effect on productivity is substantial.

JP2013010634 discloses a lifetime judgement apparatus of a chain which comprises a rotation-detection unit which detects the rotation speed of arbitrary rotating shafts. The length of the chain is detected from pulses from the rotation-detection unit and compared to a predetermined length of a novel chain. A 5% elongation in the overall length of the chain is disclosed as a limit for alert.

One of the problems associated with the above arrangement is that the elongation in the overall length is not a good indicator of the condition of the chain. Hoists are not typically driven between their extreme points all the time so the chain does not wear evenly. The chain experiences most wear in the part which has the most interaction with the actuator moving the chain. One worn out link is enough to cause a malfunction or an accident even though all the remaining links would be intact. This kind of wearing would remain undetected if only elongation of the chain is measured.

BRIEF DESCRIPTION OF THE INVENTION

An object of the present invention is thus to provide a method and an arrangement for implementing the method so as to alleviate the above disadvantages. The objects of the invention are achieved by a method and an arrangement which are characterized by what is stated in the independent claims. The preferred embodiments of the invention are disclosed in the dependent claims.

The invention is based on the idea based on the realization that wear and tear of the chain affects the electric drive system of the hoist arrangement. Deviations in the chain can be detected by measuring quantities, such as load, speed or electric current of the electric drive system, of the electric drive system while the hoist is operated. An intact chain can be seen as relatively constant load when it is reeled in but the electric drive system experiences a distinct load peak when a damaged link is reeled in. So the damaged link causes an impulse that can be detected within the electric drive system, i.e. on motor side from an actuator. No changes, alterations or sensors on the opposite side, i.e. load side from the actuator, are needed.

An advantage of the method and arrangement of the invention is that a single damaged link in the chain can be detected in an otherwise intact chain. Even the exact position of the damaged link(s) can be extracted if the measured data is combined with position measurement data. These measurements can be performed while the hoist is operated normally so unnecessary stoppage can be avoided. Preferably the needed measurement data can be produced without any additional hardware using existing sensors.

BRIEF DESCRIPTION OF THE DRAWINGS

In the following the invention will be described in greater detail by means of preferred embodiments with reference to the accompanying drawings, in which.

DETAILED DESCRIPTION OF THE INVENTION

Figure 1:
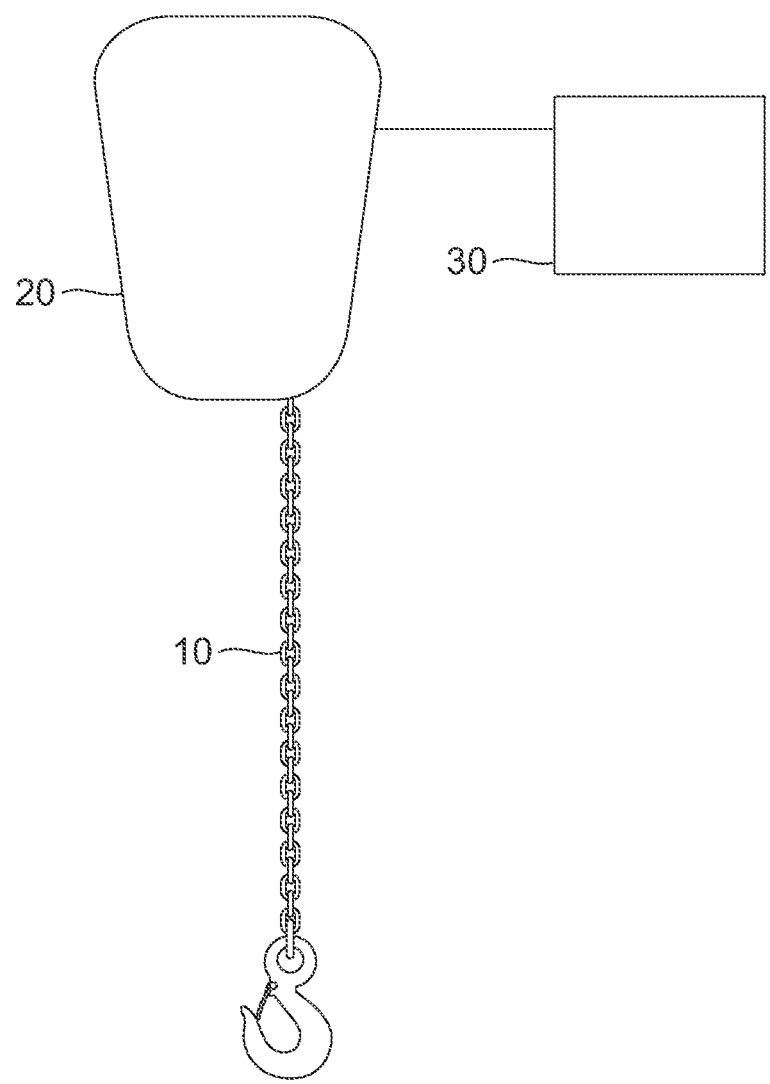
FIG. 1 illustrates a general hoist arrangement.

FIG. 1 is shows a hoist arrangement which comprises an electrically driven actuator 20 which is controlled with a control system 30. The actuator 20 reels in and out a chain 10 for raising or lowering a payload fastened to the chain with e.g. a hook. The actuator 20 comprises or is driven by an electric motor which is operated with the control system 30. The electric motor operates one or more sprockets, wheels, pulleys or other actuators which interact with the chain such that the rotating motion of a shaft of the electric motor reels in and out the chain as needed. The electric motor is preferably frequency-converter-driven. In an embodiment the hoist arrangement comprises a contactor drive. In the embodiment of contactor drive, the system preferably comprises a data processing unit for performing measurements and analysis. The electric drive system of the hoist arrangement comprises the electrically driven actuator 20, the electric drive and the control system 30.

Drive-related quantities of the electric motor can be measured with sensors from the electric motor, the frequency converter and/or the control system. Useful signals for detecting deviations in the chain include load signal and speed signal but other signals may also be possible to use for that purpose. In the following, an example of load signal measurements is presented, but also other suitable signals, e.g. speed signal, could be used similarly. When a payload, e.g. a crate, hanging from the chain 10 is reeled in with the actuator, the electric motor experiences a load which consists of the force of gravity on the crate, drag of the chain 10 within the actuator's 20 gearing mechanism, friction and other losses. If the crate is reeled in, i.e. lifted, with constant speed, all the other components of the load that the electric motor experiences can be approximated to be constant except the drag of the chain 10 within the actuator's gearing mechanism in case the chain 10 is damaged. In an embodiment the load signal is measured between the actuator of the hoist arrangement (sprocket, wheel, pulley or the like) and the electric drive of the hoist arrangement. In an embodiment the load signal is measured from the electric drive side of the actuator of the hoist arrangement.

An aspect of the invention is a hoist arrangement which comprises a chain 10, an actuator 20 having an electric motor interacting with the chain for lifting and lowering a payload, and a control system 30 for controlling the electric motor. The control system 30 comprises means for measuring and outputting of a first signal for indicating a worn link in the chain. Such means can comprise for example one or more sensors for measuring one or more quantities and one or more computing devices or processors for input and output of said measured quantities. In an embodiment the measured first signal is a load signal or a speed signal. In an embodiment the control system further comprises means for measuring position signal while driving the hoist and combining the measured position signal with the measured first signal for indicating a worn link in the chain and its position in the chain. In an embodiment the drive system calculates the position signal by measuring internally the number and/or fraction of revolutions and multiplies that with a factor which depends on the circumference of the sprocket. In an embodiment the position is derived by using a sensor which measures pulses from the sprocket's shaft and multiplies that with a factor which depends on the circumference of the sprocket.

For example a transformation in a shape of a link of the chain may prevent the chain to fit properly in the gearing mechanism which increases the drag within the gearing mechanism and some additional power is momentarily needed from the electric motor to overcome this increased drag. In another example a deformed link may drag against a surface within the actuator which causes increased friction i.e. drag which again has to compensated by momentary addition of power to the electric motor. These changes can be measured from the electric motor, the frequency converter and/or the control system of the hoist arrangement. The changes or deviations can be seen by inspecting the measurement results or the control system may analyse the measurement results and produce an alert if a peak above or below a certain threshold level is detected.

In an embodiment a position signal indicating the position of the chain is measured in addition to the first signal which aims to detect deviations in the chain. The position of the chain is measured in many hoists arrangements for other purposes, such as for controlling the lifted payload, so the same signal can be used for indicating the part of the chain which currently affects the measurement of the first signal, such as the load signal or the speed signal. By combining the results of the measurements the first signal can be presented as a function of position of the chain, for example load is presented as a function of position of the chain in the example of FIG. 2b. Without the information from the position signal, the first signal (e.g. load) has to presented as a function of e.g. time or some other quantity which does not directly indicate the position in the chain so search for the indicated damaged link is more difficult. In an embodiment one or more measurements are performed with a frequency converter of an electric drive of the hoist. In an embodiment one or more measurements are performed with a control system of an electric drive of the hoist.

In an embodiment a load signal is produced with a strain gauge measurement. The strain gauge measurement can be realized with a strain gauge sensor mounted in the proximity of bearings of a payload-bearing shaft of the drive system. The sensor could also be mounted in the proximity of bearings of a drive shaft of the actuator. In an embodiment the strain gauge sensor is mounted onto bearing frame of a shaft, next to the bearings of the shaft of the actuator 20.

The load measurement can be based on the fact that the dimensions of a worn link of the chain have changed during the wearing of the link. This can be seen especially in the inside ends of the worn link. This causes additional friction (compared to an intact chain) and minor deformations in the chain when the damaged part of the chain is reeled through the actuator. In practice the worn link travels a slightly different route in the actuator than an intact link thus rubbing itself against other links, sprockets and chain guides around sprockets in a different way than an intact link. This deviation leads to an increased resistance to motion and/or increased friction (compared to an intact link) which can be seen as an increased load, e.g. at the strain gauge sensor, when the worn link is handled.

An aspect of the invention is a method of detecting worn link in a chain 10 of a hoist arrangement. The worn link is detected by measuring a first signal 11 of the hoist arrangement while driving the hoist and detecting peaks 13, 15 crossing of a certain threshold level 19 in the measured first signal 11. The peaks 13, 15 in the measured first signal 11 represent a worn link (12, 14) in the chain 10. The peaks can be positive and/or negative peaks in the measured signal so the threshold level can be above and/or under the normal operating range which an intact chain produces. In an embodiment the measured first signal 11 is a load signal of the hoist and peaks 13, 15 above a certain threshold level 19 are detected. In an embodiment the measured first signal 11 is a load signal of the hoist and peaks 13, 15 above and under a certain threshold level 19 are detected. In an embodiment the measured first signal is a speed signal of the hoist and peaks crossing a certain threshold level are detected.

Figure 2A:
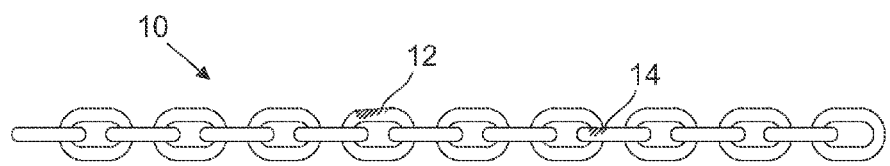
FIGS. 2a and 2b illustrate an example of a chain with damages and corresponding measurement results of the chain.
Figure 2B:
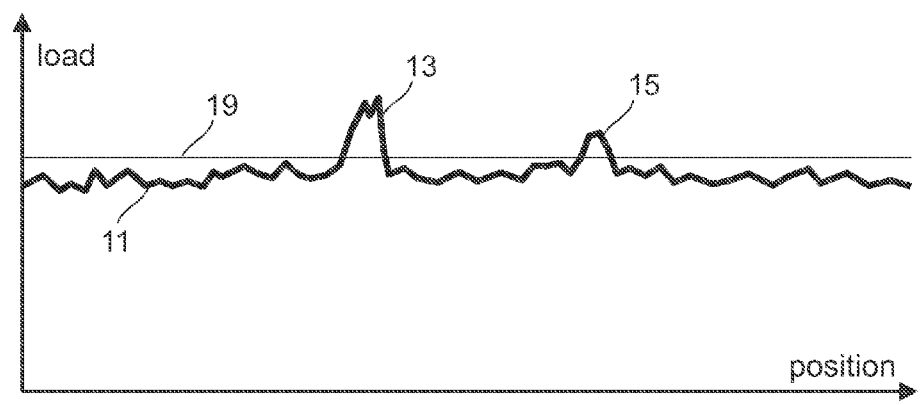

FIG. 2a illustrates an example of a part of chain 10 that has two worn/damaged links 12 and 14. The first worn/damaged link 12 has a more pronounced damage and the second link 14 has experienced a minor transformation in its shape. FIG. 2b illustrates an exemplary graph 11 of what could be the measurement result for the chain of FIG. 2a. The figures are aligned such that the graph 11 of FIG. 2b shows in each point the measurement result of that of the chain 10 of FIG. 2a which is directly above the graph 11. In FIG. 2b, a threshold level 19 is indicated with a horizontal line and a measurement result above that line indicates damage in a link of the chain 10. A suitable threshold level 19 may vary between different hoist arrangements. A good starting point for the threshold level is slightly above the level which is received from measurement of a new and intact chain.

When following the graph 11 of FIG. 2b from left to right, small jitter or noise can be seen in the intact part of the chain before the first damaged link 12. The jitter or noise is typically caused by the angular type of movement of a chain in a sprocket. The graph 11 nevertheless lies below the threshold level until the first damaged link 12 enters the actuator's gearing mechanism. The first damaged link 12 has experienced major damage and it produces a distinct peak 13 to the graph 11. Between the damaged links 12 and 14 again some jitter or noise may exist but it is below the threshold level 19. The second damaged link 14 has experienced minor damage and it produces clear but less distinct peak 15 compared to the first damaged link 12. After the second damaged link 14 the rest of the chain is more or less intact and only small jitter or noise can be seen but again it stays below the threshold level. In some cases another threshold level under the normal range of operation can be used to detect momentary decreases in load. Similar behaviour can also be seen in other measurements of drive-related quantities, such as speed measurements. Depending on the measured quantity, the deviation can reach higher or lower levels but the described principle still applies.

In an embodiment position signal is measured while driving the hoist. The position signal can be combined with the measured first signal, such as load signal, for extracting a position of a worn link in the chain from the measured signals. This is illustrated in FIG. 2b in which locations of the peaks, i.e. damaged links, are directly comparable to the positions of the damaged links in the actual chain. The horizontal axis can represent for example position in millimeters from the outer or inner end of the chain.

In an embodiment the measuring is performed while driving the hoist. In most cases the deviations in the measurement results become clearer when a payload is lifted with the hoist, compared to driving the hoist without a payload. In an embodiment the measuring is performed while driving the hoist having a payload. The threshold 19 may change depending on the mass of the payload that is lifted. In an embodiment the measuring is performed with rated load or rated payload of the hoist which gives clear and comparable results and a fixed threshold can be used.

An aspect of the invention is the use of a speed signal or a load signal 11 of a hoist arrangement for detecting a worn link 12, 14 in a chain 10 of the hoist arrangement.

It will be obvious to a person skilled in the art that, as the technology advances, the inventive concept can be implemented in various ways. The invention and its embodiments are not limited to the examples described above but may vary within the scope of the claims.

The invention claimed is:

1. A method of detecting a worn link in a chain of a hoist arrangement operated with an electric drive system, the method comprising the step of:
measuring a first signal of the electric drive system of the hoist arrangement while driving the hoist and detecting a peak crossing of a certain threshold level in the measured first signal, said peak in the measured first signal representing the worn link in the chain,
said method further comprising at least one of the following:
that the measured first signal is a load signal of the electric drive system of the hoist and peaks above a certain threshold level are detected; and that
the measured first signal is a speed signal of the electric drive system of the hoist and peaks crossing a certain threshold level are detected.

2. The method according to claim 1, further comprising the step of measuring a position signal of the electric drive system while driving the hoist and combining the measured position signal with the measured first signal for extracting a position of the worn link in the chain from the measured signals.

3. The method according to claim 1, wherein the measuring is performed while driving the hoist with rated load of the hoist.

4. The method according to claim 1, wherein one or more measurements are performed with a frequency converter of the electric drive of the hoist.

5. The method according to claim 1, wherein one or more measurements are performed with a control system of the electric drive of the hoist.

6. The method according to claim 1, wherein one or more measurements are performed using a strain gauge sensor located at a bearing frame of a shaft of the hoist arrangement.

7. A hoist arrangement comprising:
a chain;
an electric drive system comprising an actuator having an electric motor interacting with the chain for lifting and lowering a payload; and
a control system for controlling the electric motor,
wherein the control system comprises means for measuring and outputting of a first signal for indicating a worn link in the chain, and
wherein the first signal comprises at least one of the following: a load signal of the electric drive system and a speed signal of the electric drive system.

8. The hoist arrangement according to claim 7, wherein the control system further comprises means for measuring a position signal while driving the hoist and combining the measured position signal with the measured first signal for indicating a worn link in the chain and its position in the chain.

9. The hoist arrangement according to claim 7, wherein the first signal is measured with a strain gauge sensor.

10. The hoist arrangement according to claim 9, wherein the strain gauge sensor is mounted onto a periphery of a bearing frame of a shaft of the actuator.

11. A method comprising the step of:
using a load signal of a hoist arrangement for detecting a worn link in a chain of the hoist arrangement,
wherein the load signal comprises a load signal of an electric drive system, the electric drive system comprising an electrically driven actuator, an electric drive and a control system.

* * * * *